United States Patent

[11] 3,592,224

| [72] | Inventor | Louis Bois<br>Sens, France |
|---|---|---|
| [21] | Appl. No. | 880,031 |
| [22] | Filed | Nov. 26, 1969 |
| [45] | Patented | July 13, 1971 |
| [73] | Assignee | Societe Technique Et Commercial<br>D'Installations Industrielles "Luceat,"<br>Sens (Yonne), France |
| [32] | Priority | Dec. 20, 1968 |
| [33] | | France |
| [31] | | 179,512 |

[54] RELIEF VALVE
15 Claims, 4 Drawing Figs.

[52] U.S. Cl. .................................................. 137/492, 137/493
[51] Int. Cl. ........................................... F16k 17/19, F16k 17/10
[50] Field of Search............................................. 137/491, 488, 489, 489.5, 492, 492.5; 137/493, 493.4, 493.9, 12, 14

[56] References Cited
UNITED STATES PATENTS

| 2,224,394 | 12/1940 | Jurs............................ | 137/491 |
| 2,576,516 | 11/1951 | Jurs............................ | 137/491 |
| 3,307,575 | 3/1967 | Dickinson et al............ | 137/491 |
| 3,401,605 | 9/1968 | Born............................ | 137/491 X |
| 3,454,039 | 7/1969 | Dunkelis..................... | 137/491 |
| 3,454,040 | 7/1969 | Dunkelis..................... | 137/493.4 X |

*Primary Examiner*—M. Cary Nelson
*Assistant Examiner*—Robert J. Miller
*Attorneys*—F. W. Anderson and C. E. Tripp ABSTRACT: A relief valve of the diaphragm type that provides pressure and vacuum relief for storage vessels. The relief valve includes a pressure pilot valve that is effective to actuate the relief valve in response to an overpressure in the storage vessel, and the pilot valve includes external adjustment means for varying the value of the pressure at which it actuates the relief valve.

The relief valve further includes a vacuum pilot valve, of substantially identical construction as the pressure pilot, that communicates with the storage vessel and the actuating chamber of the relief valve, and actuates the relief valve when the vessel is subject to a vacuum greater than the value at which the vacuum pilot is set.

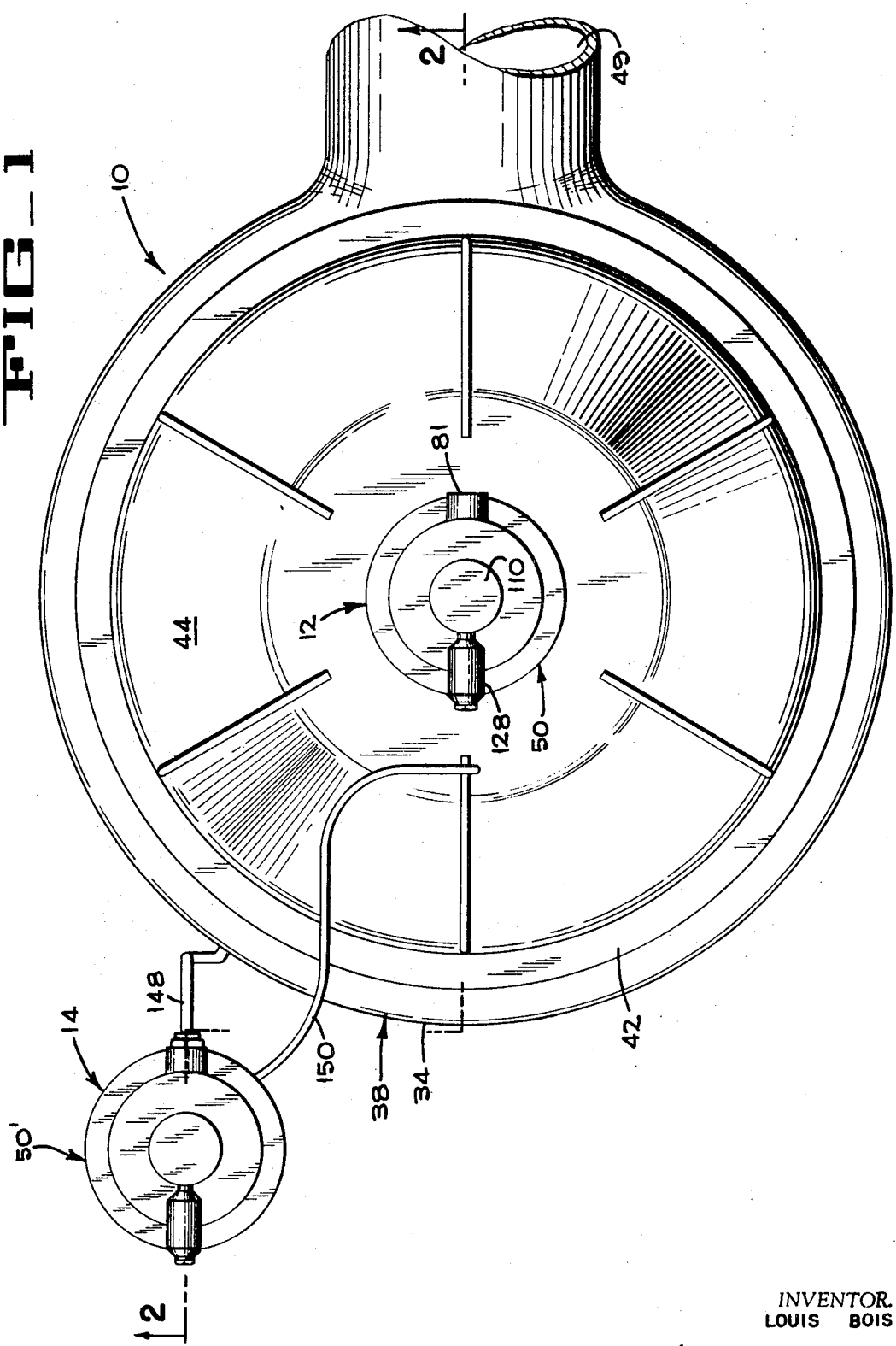

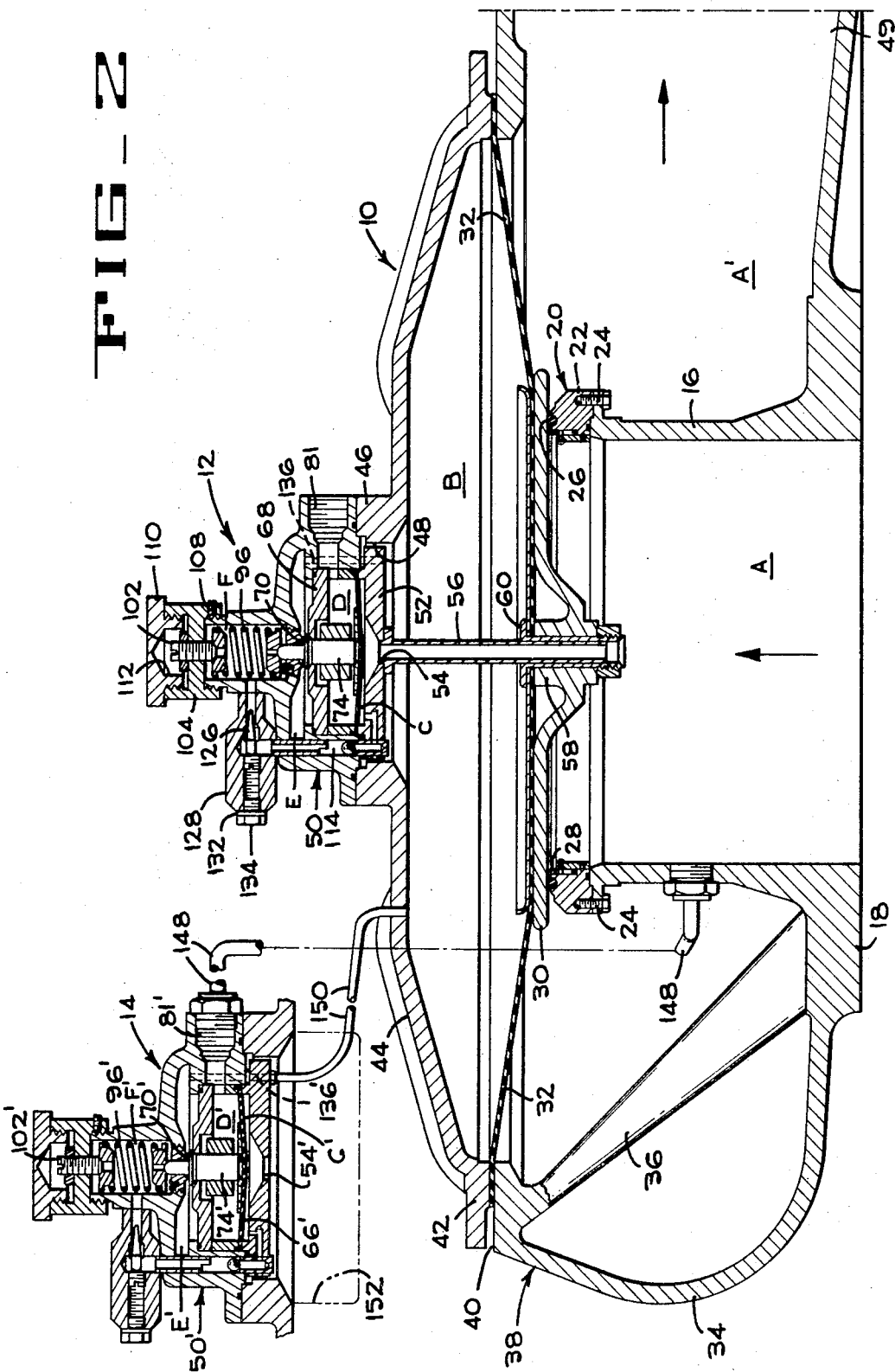
FIG_2

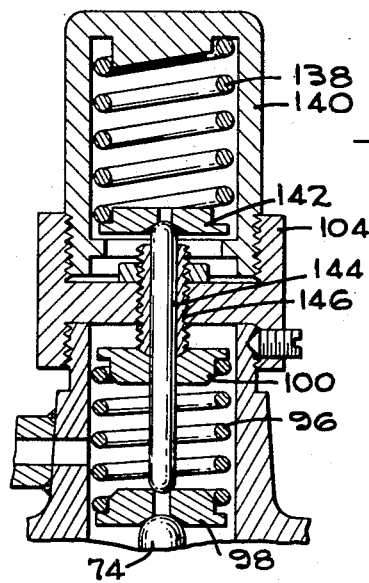
FIG_4
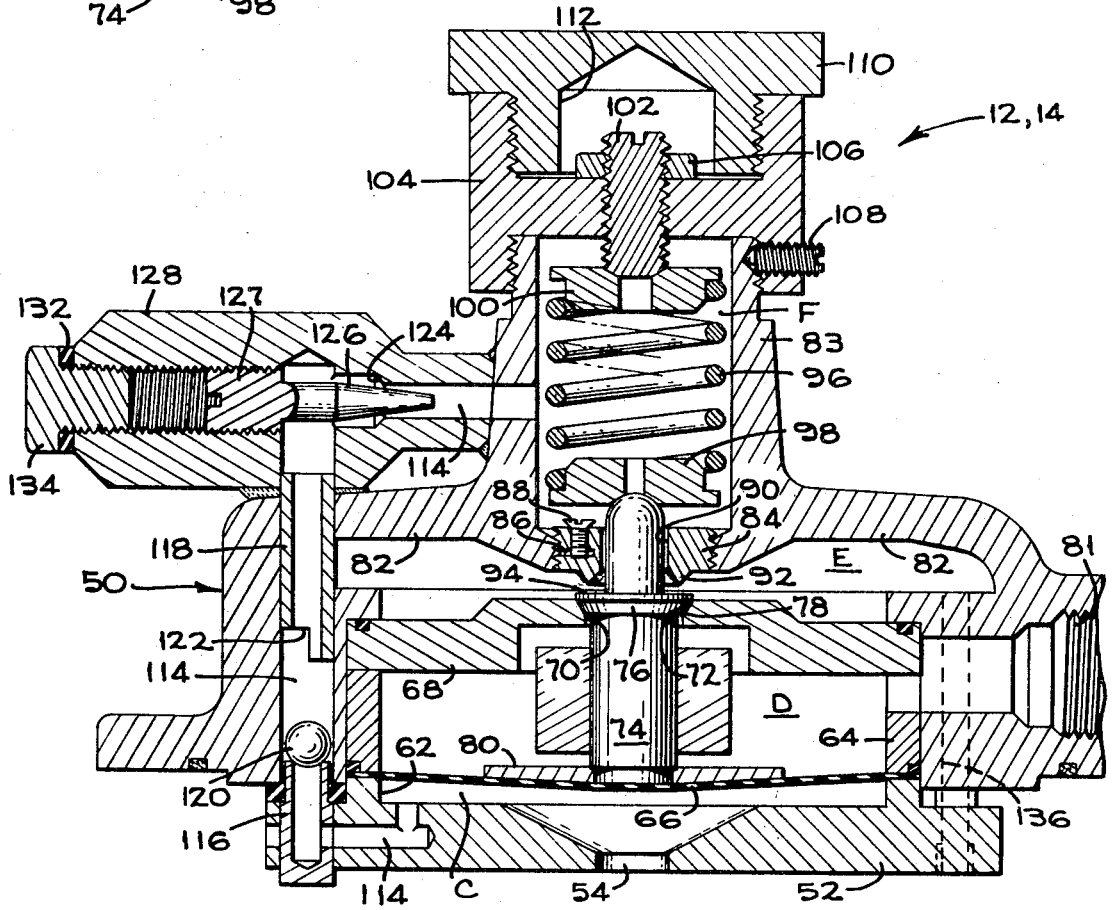
FIG_3

RELIEF VALVE

BACKGROUND OF THE INVENTION

Field of the Invention

The present invention concerns an improved pressure and vacuum relief valve of the type having a movable diaphragm and plate, and in particular concerns a pressure pilot valve and a vacuum pilot valve, both externally adjustable, to actuate the relief valve at predetermined over pressure and vacuum conditions.

SUMMARY OF THE INVENTION

The relief valve system of the present invention is employed to relieve pressure and vacuum conditions in pipelines and storage vessels with greater accuracy. One of the primary objects of the invention is to provide an adjustable means for actuating a diaphragm-type relief valve when the pressure or vacuum exceeds the desired limit. A pressure pilot valve having a valve stem with opposing seats for alternately interconnecting chambers within the pilot is actuated by means of the pressure from within the storage vessel and is employed to actuate the relief valve. The pressure at which the pressure pilot actuates the relief valve is determined by a spring against which the valve stem must move in response to pressure within the storage vessel.

Another feature of the invention is the provision of an external adjustment and enabling the spring pressure to be varied thereby permitting adjustment of the release pressure without extensive disassembly of the relief valve or the pilot valve.

Another feature of the invention is the provision of an adjustment of the distance between the opposing seats thereby enabling further variation in the response of the pilot valve. In addition, the response range of the pilot can be further increased by means of a booster spring assembly that cooperates with the previously mentioned spring to further increase the force against the valve stem. This feature has the advantage that the booster assembly can be installed by the removal and replacement of externally accessible parts.

In order to provide a similarly accurate and flexibly adjustable vacuum relief of the storage vessel, a vacuum relief pilot of identical construction to the pressure pilot is also employed with the relief valve. An additional advantage of standardization and cost reduction is obtained by the identical construction of the pressure and vacuum pilot valves.

A further object of the invention is to control the closing rate of the relief valve to prevent damage thereto. For this purpose the pilots include an externally adjustable device to control the rate of gas or fluid through the pilot that actuates the relief valve.

In a modified form of the invention the object is to provide both pressure and vacuum relief by employing only the pressure pilot valve. In this form, the pressure relief is accomplished as before, however, by eliminating a check ball the pressure pilot functions to actuate the relief valve whenever any vacuum is present in the storage vessel.

DESCRIPTION OF THE DRAWINGS

FIG. 1 is a plan view of the relief valve system of the present invention.

FIG. 2 is a central cross section of the relief valve system taken on line 2-2 of FIG. 1.

FIG. 3 is an enlarged central section of one of the two identical pilot valves seen in FIG. 2.

FIG. 4 is a fragmentary central cross section of a booster spring unit that may be employed with the pilot valve of FIG. 3.

DESCRIPTION OF THE INVENTION

The relief valve system shown in FIGS. 1 and 2 generally comprises a diaphragm type relief valve 10, a pressure pilot valve 12, and a vacuum pilot valve 14. This type of system is commonly employed to protect storage vessels and pipe lines from rupture. The relief valve 10, best seen in FIG. 2, includes an inlet pipe section 16 with an integral flange 18 for attachment to a corresponding flange (not shown) forming part of a storage tank or product transport pipe (not shown). This inlet pipe section 16 is provided on its upper end with an antivibration seat assembly 20 described in detail in my copending U.S. Pat. application Ser. No. 880,038 filed on even date herewith. The seat assembly basically consists of an annular body 22 retained on the pipe section 16 by means of multiple bolts 24, stationary O-ring seat 26, and an annular floating seat 28 mounted in the body for engagement with a valve plate 30 supported on a flexible diaphragm 32.

A curved outer wall 34 generally toroidal shape and surrounding the inlet pipe 16, and having stiffening rigs 36, forms a body 38 of the relief valve 10. The upper part of the body 38 is open, and by means of a peripheral flange 40 cooperates with an opposing flange 42 of a rib cover plate 44 to retain the diaphragm 32 and seal the body of the relief valve. The cover is secured to the body in a conventional manner (not shown), such as by bolting or clamping. In the closed position (FIG. 2) the relief valve is divided into three chambers: (1) the inlet pipe 16 designated as chamber A, a lower chamber A' in the body 38, and an upper chamber B between the diaphragm 32 and the cover 44. The central part of the cover has a circular flange 46 with a central bore 48 on which the pilot valve 12 is mounted and sealed in a conventional manner. An exhaust port 49 in the curved outer wall 34 provides a means of discharging the released pressure to the outside atmosphere.

The pressure pilot valve has a body 50 that includes a bottom portion 52 having an aperture 54 therein. A hollow guide tube 56, rigidly mounted in the aperture, extends downwardly through a circular boss 58 centrally positioned in the valve plate 30, and into the inlet pipe section 16. The guide is slidingly received in a bushing 60 that provides a pressuretight fit between the guide and the boss.

Pressure Pilot Valve

As best observed in FIG. 3, the body 50 of the pressure pilot valve 12 is divided into four separate chambers indicated by letters C through F. Chambers C and D have annular sidewalls 62 and 64, respectively, and are separated by a flexible diaphragm 66. The chamber C is enclosed below by the bottom 52 of the valve's body 50, and the chamber D is enclosed at its top by a plate 68 mounted on the wall 64. An opening 70, centrally located in the plate 68, has a seat 72 formed thereon. A valve stem 74, located in and extending through the opening 70, has a flange 76 formed thereon with a lower tapered surface 78 for engaging the seat 72. The valve stem 74 is attached to the flexible diaphragm 66 by means of a mounting disc 80, and thus is subjected to vertical reciprocating motion by the diaphragm 66 in response to the difference in pressure between chambers C and D. As seen in FIG. 3, chamber C also has an exhaust port 81 communicating with the exterior of the body 50.

Chamber E is located above chamber D, its bottom formed by the plate 68 and its top and sides constituted by inwardly extending wall 82 of the body 50. The upward annular extension 83 of the wall 82 forms a chamber F that is separated from the chamber E by means of a threaded insert 84. In order to positively lock it into the wall 82, the insert is slotted at 86 and tapped to receive a lock screw 88. By tightening the lock screw the insert is slightly expanded at the slot, causing its thread to bind against the mating threads in the wall 82. The insert has a central aperture 90 and a downwardly extending seat 92. The previously described valve stem 74 extends upwardly through the aperture 90, so that when the stem is in the raised position an upper surface 94 of the flange 76 engages the periphery of seat 92, closing off chamber E from chamber F and opening aperture 70 between chambers D and E. It will also be apparent that the distance between the opposing seats 72 and 92 may be changed by varying the depth insert 82 is screwed into the threads in wall 82.

Located within chamber F is a spring 96 supported between a pair of bearing washers 98 and 100. The lower washer 98 bears against the upper portion of the valve stem 74, while the upper washer 100 is compressed toward the valve spring by a spring compression adjusting screw 102. The screw 102 is threaded into the cap 104 which, in turn, is threaded on the upwardly extending sidewall 83 of the valve body 50. The cap 104 is prevented from rotating on the valve body by means of a set screw 108, and the position of the spring compression adjusting screw 102 is locked by means of a nut 106. The end cap 104 is closed by means of a cover 110 threadably received thereon and having a cavity 112 that provides clearance for the upwardly projecting screw 102 and nut 106.

Chambers C and F are interconnected by a generally C-shaped channel indicated at 114. A pair of sleeves 116 and 118 are pressed into the vertical portion of channel 114 with a check ball 120 located between them. The upper end of the lower sleeve 116 acts as a seat for the ball 120, while the upper sleeve 118 is notched at 122 to permit passage of gas or fluid upwardly around the ball. The upper horizontal leg of channel 114 opens into chamber F, and contains a seat 124 for a tapered needle valve 126. The needle valve has a slotted head 127 received in a threaded extension 128 of the valve body 50, so that its position with respect to the seat 124 can be adjusted. The end of the threaded cavity in which the needle valve 126 is received is closed by means of a gasket 132 and a capscrew 134. By adjusting the needle valve 126 the flow rate through channel 114, and hence between chambers C and F, can be governed to vary the closing rate of the pilot valve.

A second communicating channel is indicated in dotted lines at 136 (FIG. 3). This channel interconnects chamber E of the pilot valve with chamber B of the relief valve, seen in FIG. 2.

FIG. 4 illustrates a modified form of the pilot valve 14 in which an additional booster spring 138 is included to increase the downward force on the valve stem 74. The upper end of the booster spring 138 is supported by an enclosed housing 140 that is threadably received in the cap 104 previously described, and a bearing washer 142, that bears against a plunger 144, supports the spring at its lower end. The plunger 144 extends downwardly through a hollow adjusting screw 146, similar to screw 102 previously described, and then passes through the upper spring bearing washer 100 and the spring 96 to rest on the lower washer 98. Thus the combined compressive forces of springs 96 and 138 are transmitted to the valve stem 74.

Referring now to the valve assembly shown in FIG. 2, the vacuum pilot valve 14 is identical in construction to the pressure pilot valve 12 previously described, and the reference numerals indicate corresponding parts. The vacuum pilot valve 14 is connected to the relief valve 10 by a conduit 148 that extends from the exit port 81' of a valve 14 through the lower body portion 38 of the relief valve 10 to the interior of the upwardly extending pipe extension 16, thereby interconnecting chambers D' and A. Further, a conduit 150 between the channel 136' of the vacuum pilot valve 14 and the cover plate 44 of the relief valve 10 effects communication between chambers E' and B. It will be apparent that the booster spring 138 of FIG. 4 can be employed with the vacuum pilot valve 14 as well as the pressure pilot valve 12.

Operation

The relief valve system of the present invention has four modes of operation. The first and second modes are involved when pressure is present in the storage vessel, the first mode retaining the pressure in the vessel, and the second mode releasing excess pressure when it exceeds the limit set by the pressure pilot valve 12. The third and fourth modes of operation are involved when a vacuum is present in the storage vessel; in the third mode the relief valve 10 remains closed under a normal vacuum whereas in the fourth mode the vacuum pilot valve 14 functions to open the relief valve 10, thereby relieving the excess vacuum in the storage vessel and preventing implosion.

When the storage vessel is subjected to normal pressures within the range set for the valve unit, the normal pressure in the inlet pipe at A is transmitted up the tube 56 into chamber C, then through channel 114 past the ball check and needle valve into the chamber F. The pressure in chamber C exerts an upward force on the diaphragm 66; chamber D being open to the atmosphere. Since this force is not great enough to compress spring 96, the valve stem 74 remains in the lower position and chamber F is in communication with chamber E through the aperture 90. From chamber E the pressure is conducted into chamber B above the diaphragm via channel 136 and consequently the pressure in chambers A and B is identical and the relief valve remains closed, since the surface area above the diaphragm is greater than the surface area of the valve plate subjected to the pressure in chamber A below the valve plate. In this mode the vacuum relief valve 14 is also inoperative, since the pressure from chamber A is communicated to chamber D' and consequently the valve stem 74 is retained in the lower position sealing chamber D'.

The second mode of operation of the relief valve is in response to an excess pressure condition in the storage vessel and inlet pipe at A. The pressure from the chamber A is conducted upwardly into chamber C via the tube 56 and the pressure in chamber C is now sufficiently greater than the atmospheric pressure in chamber D so that the valve stem 74 is raised by the diaphragm again, the spring 96 thereby opening aperture 70 between chambers D and E. The upward motion of the valve stem closes aperture 90 between chambers E and F blocking pressure from chamber C passing through channel 114 into chamber F. By the opening of the aperture 70, chamber E is also open to the atmosphere and the pressure in chamber B, above the diaphragm, escapes to the atmosphere via channel 136, chamber E, chamber D, and the exhaust port 81. In response to the lowering of the pressure in chamber B, the diaphragm 32 and valve plate 30 rise, opening the relief valve and permitting the gas or liquid in the storage tank to escape into the relief valve body (chamber A') and to the atmosphere via discharge port 49.

When the pressure in the storage tank and inlet pipe at A is dropped to a value below that determined by the spring 96, the valve stem lowers and the lower surface 78 of the flange 76, engages the seat 72 thereby separating chambers D and E. The pressure from chamber C transmitted to chamber F via chamber 114 and retained therein while the valve stem is in the raised position, is now released into chamber E from where it is conducted into chamber B by the channel 136. The relief valve is then closed by means of the static pressure in chamber B being greater than the pressures in chambers A and A'.

The value of excess pressure at which the relief valve that opens and closes is simply set or adjusted by means of an external adjustment. This adjustment is accomplished by removing the cover 110 thereby exposing or providing direct access to the adjusting screw 102 and locknut 106. The pressure at which the pressure pilot is actuated opening and closing the relief valve in response thereto is determined by the compressive preload applied to the spring 96 by the screw 102.

In the third mode of operation, the storage vessel may be subjected to a vacuum and within a specified range it is not desirable for the relief valve 10 to open. When the inlet pipe is subjected to a vacuum at A, a vacuum is also drawn in the tube 56 and chamber C. However, chamber C of the pressure pilot valve 12 is sealed since the check ball 120 is drawn downwardly against the upper end of the lower sleeve 116 thereby rendering the pilot valve 12 inoperative.

The vacuum pilot 14 is operative however being connected to the relief valve 10 by lines 148 and 150. Line 148 interconnects the inlet pipe 16 with the chamber D' as seen in FIG. 2. Since chamber C' is opened to the atmosphere via the aperture 54', a vacuum in chamber D' may be effective to raise the diaphragm 66' and the attached valve stem 74'. However, until the vacuum limit established by the compression in spring 96' is exceeded the vacuum relief pilot 14 remains inoperative.

The fourth mode of operation is commenced when the vacuum at A exceeds the value set by the spring 96' and the valve stem 74' does rise opening the aperture 70' thereby interconnecting chambers D' and E' while sealing chamber F'. Chamber E' is in communication with chamber B above the diaphragm 32 of the relief valve 10 by means of the line 150 and the internal channel 136' in the valve body 50' of the vacuum relief valve. When the vacuum is drawn by the previously described path, the amount of vacuum in chamber B is equal to that of chamber A. Since the chamber B has a greater effective area, i.e., the area above both the diaphragm and the valve plate 30, a greater upward force is thereby developed than by the downward force created by the vacuum at A in the inlet pipe acting downwardly on the valve plate 30. The diaphragm and valve plate then rise permitting an inward flow of air from the atmosphere into the storage vessel until the value of the vacuum at A is less than that required to compress the spring 96', thereby closing the aperture 70' through the lowering of the valve stem 74'. Consequently the valve plate 30 mounted on the flexible diaphragm 32 lowers, closing the inlet pipe 16 to the storage vessel.

It will be apparent that the vacuum relief pressure at which the vacuum pilot valve 14 actuates is determined by the spring 96' and is adjustable by the screw 102' as previously described with reference to the pressure pilot valve 12 of identical construction. Similarly, the modified form shown in FIG. 4 can equally be applied to the vacuum pilot 14 as well as the pressure pilot valve 12. An additional means of varying the point at which the vacuum relief pilot 14 operates is provided by mounting an auxiliary chamber schematically indicated at 152 beneath the aperture 54 in communication with chamber C'. This auxiliary chamber can be subjected to a pressure or vacuum with an inert gas or air of a predetermined value thereby further increasing changing the limits at which the valve stem 74' disengages seat 70' in combination with the adjustable spring 96'.

Modified Form

A further modified form of the relief valve assembly to provide both pressure relief in the storage vessel and inlet pipe and a vacuum release can be obtained by eliminating the vacuum relief pilot 14 as well as lines 148 and 150, and by modifying the pressure pilot relief valve 12 by removing the check ball 120. The removal of this check ball does not substantially effect the pressure relief operation of the pilot 12 when positive pressure is introduced into chamber C through the tube 56 and consequently passes to chambers E and F through the C-shaped channel 114. During the upward movement of the valve stem 74, due to the pressure differential across diaphragm 66 between chambers C and D, any positive pressure in chamber E escapes downwardly through the aperture 70 and out through the exhaust port 81.

The operation of the pressure pilot valve varies somewhat from the previously described modes 3 and 4. When the vessel and inlet pipe 16 are subjected to a vacuum of any degree, the vacuum is transmitted to chamber C then to chambers E and F via the channel 114, since the channel is no longer blocked by the check ball 120. The chamber E is in direct communication with chamber B above the diaphragm by means of the interior channel 136, and therefore any vacuum present at A is transmitted through the path previously described to chamber B above the diaphragm causing the diaphragm to rise when any vacuum is present in the inlet pipe 16. It will be apparent that the vacuum release pressure cannot be varied by this method as in methods 3 and 4 previously described, since any vacuum is automatically transmitted from chambers A to B through the pilot valve arrangement and no actuation of the diaphragm 66 and the valve stem 74 is necessary. Therefore, spring 96 has no effect upon the vacuum relief in this modified form.

Although the best mode contemplated for carrying out the present invention has been herein shown and described, it will be apparent that modification and variation may be made without departing from what is regarded to be the subject matter of the invention.

What I claim is:

1. A method of actuating a diaphragm relief valve in response to a pressure, said valve having an inlet chamber A, a lower chamber A' with an exhaust, an upper chamber B and a diaphragm separating the upper chamber from the inlet and lower chambers, comprising the steps of supplying the pressure from the inlet chamber A to a first chamber C of a pressure pilot valve separated by a diaphragm from a second chamber D therein vented to the atmosphere, moving a valve stem having opposed seat-engaging surfaces against a predetermined spring pressure from engagement with a seat associated with said second chamber D to engagement with a seat separating a third chamber E from a fourth chamber F in communication with said first chamber C by means of the pressure differential between chambers C and D, opening said upper chamber B of the relief valve to the atmosphere via a communicating passage between the upper chamber B and said third chamber E then to said chamber D via the open seat, and opening said relief valve by exerting a greater pressure in said inlet chamber A than atmospheric pressure in said upper chamber B.

2. The method of claim 1 including the additional step of varying the pressure at which said relief valve is opened by varying said predetermined spring pressure against said valve stem.

3. The method of claim 1 including the additional steps of actuating the relief valve in response to a vacuum by supplying the vacuum from chamber A to chamber C, moving said valve stem into engagement with a seat-separating chambers D and E by means of the pressure differential between chambers C and D, further supplying said vacuum to chamber F from chamber C and then to the upper chamber B via an open seat between chambers E and F and a communicating channel between chambers E and B, and opening said relief valve by exerting a greater total force on one side of the relief valve diaphragm by means of chamber A and A' than the force exerted on the other side by chamber B.

4. A method of actuating a diaphragm type relief valve in response to a vacuum, having an inlet chamber A, a lower chamber A' with an exhaust, an upper chamber B and a diaphragm separating the upper chamber from the inlet and lower chambers, comprising the steps of supplying the vacuum from the inlet chamber A to a first chamber D' of a vacuum pilot valve, supplying atmospheric pressure to a second chamber C' therein separated from said first chamber D' by a diaphragm, moving a valve stem having opposed seat-engaging surfaces against a predetermined spring pressure by means of the pressure differential between chambers C' and D' from engagement with a seat associated with said first chamber D' to engagement with a seat separating a third chamber E' from a fourth chamber F' in communication with said second chamber C', interconnecting the upper chamber B of the relief valve to the vacuum at inlet A and opening said relief valve by exerting a greater total force on one side of the relief valve diaphragm by means of chambers A and A' than the force exerted on the other side by chamber B.

5. The method of claim 4 including the additional step of varying the amount of vacuum at which said relief valve is opened by varying said predetermined spring pressure against said valve stem.

6. The method of claim 4 including the additional step of varying the amount of vacuum at which said relief valve is opened by supplying a pressure other than atmospheric to chamber C'.

7. A relief valve of the type having an inlet chamber A and a lower chamber A' with an exhaust, said chambers being separated from an upper chamber B by a diaphragm, pressure pilot valve means associated with said relief valve, said pressure pilot valve means including cooperating chambers C and D separated by a diaphragm, said chamber C communicating with said inlet chamber A, said chamber D communicating with the atmosphere, a valve stem having opposed seats movable for alternate engagement with a seat communicating between chamber D and a chamber E or engagement with a seat communicating between chamber E and a chamber F, a passage interconnecting chambers C and F, said valve stem being moved by said diaphragm against a predetermined spring pressure in response to a pressure differential between chamber C and D, said pressure pilot valve means being effective to maintain said relief valve in a closed position when said pressure does not exceed a value determined by said spring pressure by said passage between chambers C and F.

8. The relief valve of claim 7 wherein said valve further includes vacuum pilot valve means, said pilot valve means including cooperating chambers C' and D' separated by a diaphragm, said chamber D' communicating with said inlet chamber A, said chamber C' being in communication with the atmosphere, a valve stem having opposed seats movable for alternate engagement with a seat communicating between chamber D' and a chamber E' or engagement with a seat communicating between chamber E' and a chamber F', a passage interconnecting chamber C' and F', said valve stem being moved by said diaphragm against a predetermined spring pressure in response to a pressure differential between chambers C' and D', said vacuum pilot valve means being effective to maintain said relief valve in a closed position when said vacuum does not exceed a value determined by said spring pressure, said vacuum pilot valve means being effective to open said relief valve when said vacuum does exceed said value by interconnecting chambers A and B via a communication between chamber A and D' then to chamber E' and then to chamber B via a passage between chambers E' and B.

9. The relief valve of claim 7 wherein the pressure at which said relief valve opens can be varied by an adjusting means for varying said predetermined spring pressure in said pressure pilot valve means.

10. The relief valve of claim 7 wherein said pressure pilot valve means includes external adjustment means for varying said spring pressure.

11. The relief valve of claim 8 wherein said vacuum pilot valve means further includes an adjusting means for varying said predetermined spring pressure.

12. The relief valve of claim 8 wherein said vacuum pilot valve means includes externally accessible adjustment means for varying said spring pressure.

13. The relief valve of claim 8 wherein the value of the vacuum at which the relief valve is actuated can be varied by placing chamber C' in communication with a pressure other than atmospheric.

14. The relief valve of claim 9 wherein said pressure pilot valve means further includes a booster spring means that cooperates with said adjustable spring pressure means for varying said spring pressure over a larger range of values.

15. The relief valve of claim 11 wherein said vacuum pilot valve means further includes a booster spring means that cooperates with said adjustable spring pressure means for varying said spring pressure over a larger range of values.